US012681212B2

(12) United States Patent
Seo et al.

(10) Patent No.: US 12,681,212 B2
(45) Date of Patent: Jul. 14, 2026

(54) ANTI-GLARE FILM AND DISPLAY APPARATUS

(71) Applicant: LG CHEM, LTD., Seoul (KR)

(72) Inventors: Jung Hyun Seo, Daejeon (KR); Hanna Lee, Daejeon (KR); Kwangseok Seo, Daejeon (KR); Yeongrae Chang, Daejeon (KR)

(73) Assignee: XINMEI FONTANA HOLDING (HONG KONG) LIMITED, Hong Kong (CN)

( * ) Notice: Subject to any disclaimer, the term of this patent is extended or adjusted under 35 U.S.C. 154(b) by 984 days.

(21) Appl. No.: 16/975,964

(22) PCT Filed: Apr. 5, 2019

(86) PCT No.: PCT/KR2019/004093
§ 371 (c)(1),
(2) Date: Aug. 26, 2020

(87) PCT Pub. No.: WO2019/216552
PCT Pub. Date: Nov. 14, 2019

(65) Prior Publication Data
US 2020/0400860 A1 Dec. 24, 2020

(30) Foreign Application Priority Data

May 11, 2018 (KR) ........................ 10-2018-0054363

(51) Int. Cl.
*G02B 1/111* (2015.01)
*C09D 5/00* (2006.01)
(Continued)

(52) U.S. Cl.
CPC .............. *G02B 1/111* (2013.01); *C09D 5/006* (2013.01); *C09D 7/61* (2018.01); *C09D 7/65* (2018.01);
(Continued)

(58) Field of Classification Search
CPC ........ G02B 1/111; G02B 1/14; G02B 5/0242; G02B 5/0294; G02B 5/20; C09D 5/006;
(Continued)

(56) References Cited

U.S. PATENT DOCUMENTS

| | | |
|---|---|---|
| 2008/0030861 A1 | 2/2008 | Ookubo et al. |
| 2008/0088961 A1 | 4/2008 | Kushida |
(Continued)

FOREIGN PATENT DOCUMENTS

| | | |
|---|---|---|
| CN | 1989451 A | 6/2007 |
| CN | 101128753 A | 2/2008 |
(Continued)

OTHER PUBLICATIONS

International Search Report and Written Opinion issued for International Application No. PCT/KR2019/004093 on Aug. 2, 2019, 11 pages.
(Continued)

*Primary Examiner* — Megha M Gaitonde
(74) *Attorney, Agent, or Firm* — Ricky Lam

(57) ABSTRACT

[Summary]
The present invention relates to an anti-glare film and a display apparatus, and more particularly to an anti-glare film including: a light-transmitting substrate; and a hard coating layer containing a binder resin, organic fine particles and inorganic fine particles dispersed in the binder resin, wherein a ratio of two or more organic fine particles aggregating with each other in the whole organic fine particles is 5% or less, and wherein a ratio of internal haze to external haze is 2.5 or less, and a display apparatus including the anti-glare film.

8 Claims, 2 Drawing Sheets

(51) Int. Cl.

| | | |
|---|---|---|
| *C09D 7/61* | (2018.01) | |
| *C09D 7/65* | (2018.01) | |
| *C09D 135/02* | (2006.01) | |
| *G02B 1/14* | (2015.01) | |
| *G02F 1/13* | (2006.01) | |

(52) U.S. Cl.

CPC ............. *C09D 135/02* (2013.01); *G02B 1/14* (2015.01); *G02F 1/13* (2013.01); *G02F 2201/38* (2013.01)

(58) Field of Classification Search

CPC .......... C09D 7/61; C09D 7/65; C09D 135/02; C09D 4/06; C09D 7/42; C09D 7/70; C09D 7/40; C09D 7/63; C09D 7/69; C09D 7/67; C09D 7/68; C09D 133/08; G02F 1/13; G02F 2201/38; C08F 222/1065; C08F 257/02; C08F 265/06; B32B 3/263; B32B 3/30; Y10T 428/24479; Y10T 428/24612; Y10T 428/2495; Y10T 428/24942
USPC ................................. 428/156, 172, 212, 213
See application file for complete search history.

(56) References Cited

U.S. PATENT DOCUMENTS

| | | | |
|---|---|---|---|
| 2008/0137206 A1 | 6/2008 | Nakamura et al. | |
| 2008/0286527 A1 | 11/2008 | Haga et al. | |
| 2009/0052043 A1 | 2/2009 | Iwata et al. | |
| 2012/0105769 A1 | 5/2012 | Fukuda et al. | |
| 2013/0027641 A1 | 1/2013 | Kodama et al. | |
| 2014/0177060 A1 | 6/2014 | Furui et al. | |
| 2014/0211316 A1 | 7/2014 | Furui et al. | |
| 2014/0340755 A1 | 11/2014 | Eguchi et al. | |
| 2015/0260882 A1 | 9/2015 | Furui et al. | |
| 2017/0363779 A1 | 12/2017 | Lee et al. | |
| 2018/0179395 A1 | 6/2018 | Seo et al. | |
| 2018/0223113 A1 | 8/2018 | Seo et al. | |
| 2018/0230317 A1 | 8/2018 | Seo et al. | |
| 2018/0348408 A1 | 12/2018 | Serizawa et al. | |
| 2021/0032478 A1 | 2/2021 | Lee et al. | |

FOREIGN PATENT DOCUMENTS

| | | | | |
|---|---|---|---|---|
| CN | 101251608 | A | | 8/2008 |
| CN | 101726768 | A | | 6/2010 |
| CN | 105005104 | A | | 10/2015 |
| EP | 3285095 | A1 | | 2/2018 |
| JP | 2006343630 | A | * | 12/2006 |
| JP | 2007-017842 | A | | 1/2007 |
| JP | 2008-299007 | A | | 12/2008 |
| JP | 2010-102186 | A | | 5/2010 |
| JP | 2011-221420 | A | | 11/2011 |
| JP | 2012-098425 | A | | 5/2012 |
| JP | 2013-105160 | A | | 5/2013 |
| JP | 2013-178533 | A | | 9/2013 |
| JP | 5364413 | B2 | | 12/2013 |
| JP | 2014-149504 | A | | 8/2014 |
| JP | 2015-172641 | A | | 10/2015 |
| JP | 2015-206837 | A | | 11/2015 |
| JP | 2015-206841 | A | | 11/2015 |
| JP | 2017-227900 | A | | 12/2017 |
| JP | 2018-517183 | A | | 6/2018 |
| JP | 2018-533067 | A | | 11/2018 |
| JP | 2021-507319 | A | | 2/2021 |
| KR | 10-2008-0035372 | A | | 4/2008 |
| KR | 10-2012-0024211 | A | | 3/2012 |
| KR | 10-2014-0072859 | A | | 6/2014 |
| KR | 10-2014-0086657 | A | | 7/2014 |
| KR | 10-2015-0120264 | A | | 10/2015 |
| KR | 10-2017-0082922 | A | | 7/2017 |
| KR | 10-2017-0106903 | A | | 9/2017 |
| TW | 200640684 | A | | 12/2006 |
| TW | 201202752 | A | | 1/2012 |
| TW | 201541113 | A | | 11/2015 |
| TW | 201734505 | A | | 10/2017 |
| WO | 2013-035656 | A1 | | 3/2013 |
| WO | 2013-054804 | A | | 4/2013 |
| WO | 2013-099931 | A1 | | 7/2013 |
| WO | 2017-141903 | A1 | | 8/2017 |
| WO | 2019-065865 | A1 | | 4/2019 |

OTHER PUBLICATIONS

Extended European Search Report dated Jan. 20, 2021, of the corresponding European Patent Application No. 19800681.9, 9 page.

* cited by examiner

【FIG. 1】
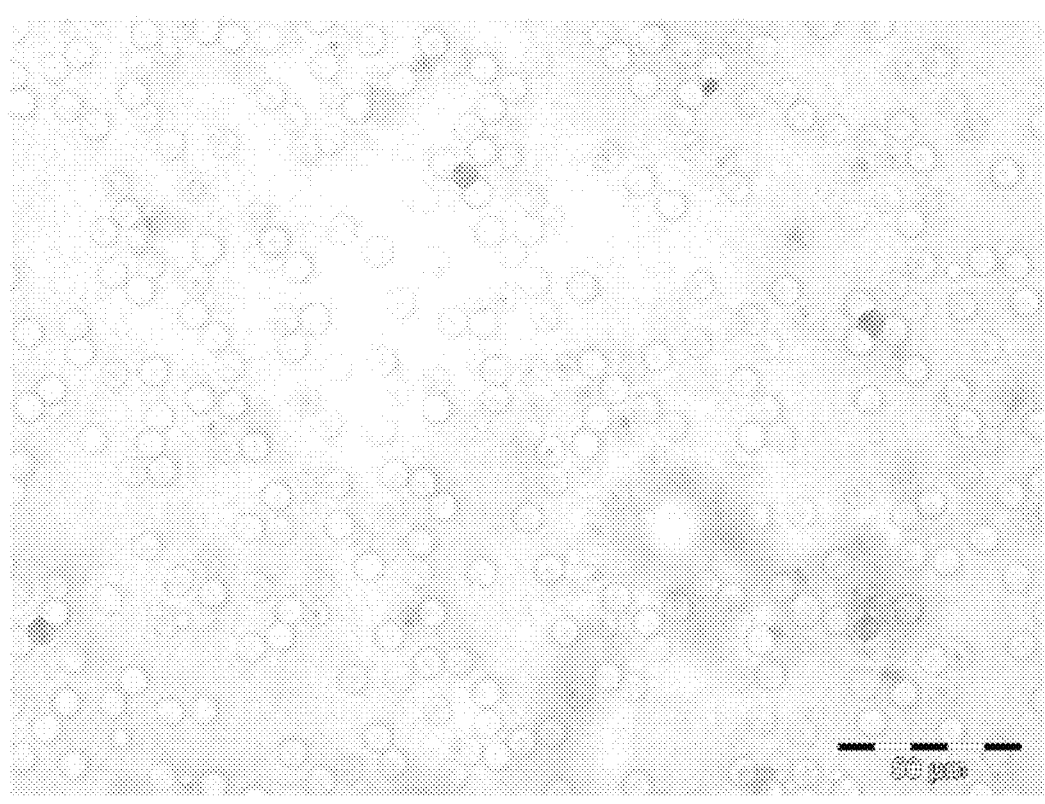

【FIG. 2】
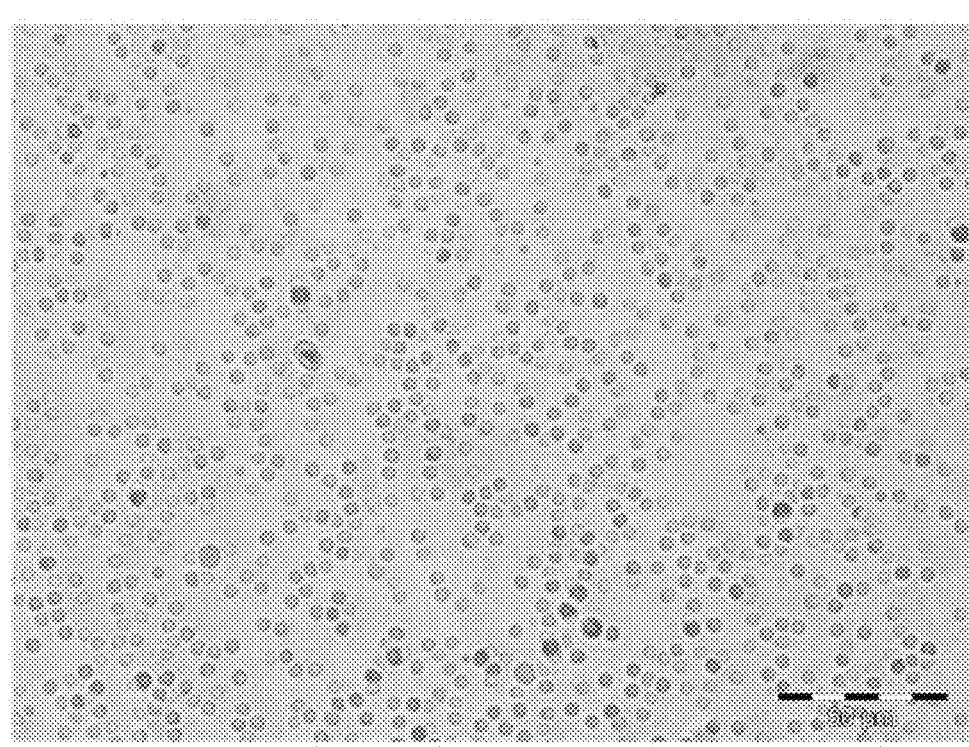

ANTI-GLARE FILM AND DISPLAY APPARATUS

CROSS-REFERENCE TO RELATED APPLICATION(S)

This application is a 35 U.S.C. 371 National Phase Entry Application from PCT/KR2019/004093, filed on Apr. 5, 2019, designating the United States, which claims the benefit of the filing date of Korean Patent Application No. 10-2018-0054363 filed with Korean Intellectual Property Office on May 11, 2018, the entire contents of which are incorporated herein by reference.

TECHNICAL FIELD

The present invention relates to an anti-glare film and a display apparatus.

BACKGROUND OF THE INVENTION

As flat panel display technologies are developed toward a large area and a high resolution, the applied products are being developed into large area displays such as outdoor advertising boards and electric sign boards for homes and offices such as TV, monitor, and mobile phones.

When flat panel displays (FPDs), including LCD, PDP, OLED, rear-projection TV, etc., have a reflection of light on the surface of the monitor when exposed to an external light such as natural light, causing eye fatigue or headache and blurry vision at the image created in the displays.

In order to solve these disadvantages, an anti-glare film is applied in which unevenness is formed on a surface of a display to scatter external light on the surface, or the difference in refractive index between the resin forming a coating film and fine particles is used to induce internal scattering of light.

Anti-glare films applied to the surface of a display apparatus or the like for such a purpose are required to have high image definition and high contrast ratio as well as anti-glare function.

However, generally, the higher haze value leads to the greater diffusion of the external light, which improves the anti-glare effect. But, it also incurs the image distortion due to surface scattering of light and the whitening phenomenon due to internal scattering of light, consequently deteriorating the contrast ratio.

As such, increasing the image definition and the contrast ratio leads to deterioration in the anti-glare properties; and increasing the anti-glare property leads to deterioration in the image definition and the contrast ratio. It is thus considered as an important technique to control such characteristics in the manufacture of an anti-glare film for high resolution display.

BRIEF SUMMARY OF THE INVENTION

The present invention provides an anti-glare film capable of preventing a defective sparkling while exhibiting high contrast ratio and excellent image definition.

The present invention also provides a display apparatus including the above-mentioned anti-glare film and capable of preventing a defective sparkling while exhibiting high contrast ratio and excellent image definition.

In one aspect of the invention, there is provided an anti-glare film including: a light-transmitting substrate; and a hard coating layer containing a binder resin, organic fine particles and inorganic fine particles dispersed in the binder resin, wherein a ratio of two or more organic fine particles aggregating with each other in the whole organic fine particles is 5% or less, and wherein a ratio of internal haze to external haze is 2.5 or less.

In another aspect of the invention, there is provided a display apparatus including the above-mentioned anti-glare film.

DETAILED DESCRIPTION OF THE INVENTION

Hereinafter, an anti-glare film and a display apparatus including the same according to specific embodiments of the present invention will be described in more detail.

As used herein, the (meth)acrylate refers to including both acrylate and methacrylate.

In addition, the photocurable resin collectively refers to a polymer resin polymerized by irradiation with light, for example, by irradiation with visible light or ultraviolet light.

According to one embodiment of the present invention, there can be provided an anti-glare film including: a light-transmitting substrate; and a hard coating layer containing a binder resin, organic fine particles and inorganic fine particles dispersed in the binder resin, wherein a ratio of two or more organic fine particles aggregating with each other in the whole organic fine particles is 5% or less, and wherein a ratio of internal haze to external haze is 2.5 or less.

On the outermost surface of notebook displays, an anti-glare coating layer is formed to reduce the surface reflection and increase the visibility of image, and the surface unevenness is formed by aggregation of the organic or inorganic particles contained in the anti-glare coating layer to induce diffuse reflection of light.

By the way, there is a problem that the light reflected at the part where the size of the aggregation formed by the organic or inorganic particles is large is amplified and recognized to be defective, and this is referred to as a defective sparkling or a defective flash.

A display with a distance close to a user, such as a notebook computer, shows a significant decrease in visibility due to defective sparkling, and accordingly, the development of a film capable of preventing a defective sparkling while exhibiting high contrast ratio and excellent image definition is needed.

The present inventors have manufactured an anti-glare film capable of preventing a defective sparkling while exhibiting high contrast ratio and excellent image definition by allowing the organic fine particles to more uniformly distribute within the hard coating layer while inducing the light scattering effect through the organic fine particles and the inorganic fine particles contained in the hard coating layer.

Specifically, the ratio of the two or more organic fine particles that aggregate with each other in the whole organic fine particles contained in the hard coating layer may be 5% or less.

The "aggregation" includes all cases where the two or more organic fine particles come in contact with each other or portions of the particles are overlapping.

In the anti-glare film of the embodiment of the invention, when the two or more organic fine particles aggregate, at least two organic fine particles in one group consisting of the two or more organic fine particles aggregating with each other may be located at different distances from one surface of the hard coating layer.

3

More specifically, in the anti-glare film of the embodiment, two adjacent organic fine particles among the two or more organic fine particles aggregating with each other are located at different distances from one surface of the hard coating layer, and the ratio of the two or more organic fine particles existing while aggregating at different positions in the thickness direction of the hard coating layer in this way is adjusted to 5% or less, or 4.5% or less, or 4% or less, or 3.5% or less, thereby preventing occurrence of a defective sparkling and greatly improving image definition.

The "two adjacent organic fine particles among the two or more organic fine particles aggregating with each other" means two organic fine particles that aggregate with or comes in direct contact with each other in one group consisting of the two or more organic particles that aggregate with each other.

The distance from one surface of the hard coating layer to the organic fine particles means the minimum distance from one surface of the hard coating layer to one point outside the organic fine particles, for example, the minimum distance from one surface of the hard coating layer to the surface of the organic fine particles.

Whether the organic fine particles have aggregated or whether two adjacent organic fine particles have been located at different distances from one surface of the hard coating layer can be confirmed by visually observing the anti-glare film or using an optical device.

For example, in the anti-glare film of the embodiment, the two adjacent organic fine particles among the two or more organic fine particles aggregating with each other may have a focus on respective optical microscopes at different positions with respect to the thickness direction on the basis of one surface of the hard coating layer.

That is, the two adjacent organic fine particles among the two or more organic fine particles aggregating with each other are present at different positions with respect to the thickness direction on the basis of one surface of the hard coating layer. Thus, during observation while moving the focus in the thickness direction of the hard coating layer using an optical microscope, it is possible to confirm the focus where two adjacent organic fine particles are respectively confirmed, that is, the position where the individual organic fine particles are present.

As described above, two adjacent organic fine particles among the two or more organic fine particles aggregating with each other may be located at different distances from one surface of the hard coating layer. For example, two adjacent organic fine particles among the two or more organic fine particles aggregating with each other may be located with a distance difference of at least 0.1 µm, or at least 0.2 µm, or at least 0.5 µm, or at least 1 µm, or at least 2 µm from one surface of the hard coating layer.

On the other hand, in general, as the haze value is higher, the degree of diffusion of external light is greater and the anti-glare effect is more excellent, while there is a problem that the image distortion due to surface scattering and the whitening phenomenon due to internal scattering lead to a decrease in contrast ratio.

In contrast, the anti-glare film of the embodiment can exhibit high contrast ratio and excellent image definition while having a haze value that is not so high, and can prevent a defective sparkling.

More specifically, the ratio of the internal haze to the external haze possessed by the antiglare film may be 2.5 or less, or 0.5 to 2, or 0.8 to 1.8.

The ratio of the internal haze to the external haze possessed by the anti-glare film may be caused by the difference of in refractive indices between the binder resin and organic fine particles or inorganic fine particles contained in the hard coating layer, the volume fraction occupied by organic fine particles or inorganic fine particles in the hard coat layer, aggregated form and aggregation size of organic or inorganic fine particles or two or more types of fine particles, and so on.

As the ratio of the internal haze to the external haze possessed by the antiglare film is 2.5 or less, or 0.5 to 2, or 0.8 to 1.8, the anti-glare film is excellent in image definition and can realize a high contrast ratio and a clear image, and further has uniform distribution of particles while having a haze value that is not so high, thus preventing the occurrence of a defective sparkling.

When the ratio of the internal haze to the external haze possessed by the anti-glare film is too low, reflection of external sunlight is not sufficient, and the visibility of the image is lowered and the image may not be clearly visible.

When the ratio of the internal haze to the external haze possessed by the anti-glare film is too high, the scattering of light that implements the image increases, and thus the image may not be clearly visible.

Specifically, the anti-glare film of the embodiment may have an external haze value of 2% to 20%, or 3% to 15%, and 3% to 30% or an internal haze value of 5% to 20%, which are within a range satisfying the ratio of the internal haze to the external haze.

Meanwhile, the anti-glare film can be provided by allowing the organic fine particles to be more uniformly dispersed and distributed during the production of the hard coating layer.

For example, by using a coating composition formed by mixing monomers, organic fine particles and inorganic fine particles forming the binder resin of the hard coating layer in the presence of a predetermined mixed solvent under predetermined stirring conditions, the hard coating layer and anti-glare film can be provided.

Although specific combinations of the organic solvents used to provide the hard coating layer and the anti-glare film are not limited, but a ketone solvent and an acetate solvent may be used as a mixture, and for example, they can be mixed and used in a weight ratio of 6:1 to 1:1, or 4:1 to 1.5:1.

The acetates may be methyl acetate, ethyl acetate, isopropyl acetate, butyl acetate, or cellosolve acetate, and the ketones may be methyl ethyl ketone, methyl isobutyl ketone (MIBK), acetylacetone, or acetone, but are not limited to the examples described above.

In addition to the acetate solvent and the ketone solvent, additional solvents may be used. For example, one or a mixture of one or more selected from the group consisting of lower alcohols having 1 to 6 carbon atoms, cellosolves, dimethylformamide, tetrahydrofuran, propylene glycol monomethyl ether, toluene and xylene can be used.

In this case, the lower alcohol may be methanol, ethanol, isopropyl alcohol, butyl alcohol, isobutyl alcohol, or diacetone alcohol.

The hard coating layer may have an appropriate thickness depending on the specific use of the anti-glare film, and for example, it may have a thickness of 1 µm to 10 µm, or 2 µm to 8 µm.

Specifically, when the anti-glare film is used for the purpose of being located on the outermost surface of the notebook, the outdoor advertising board, and the TV display device, the hard coating layer may have a thickness of 3 µm to 8 µm.

The specific kind and size of the organic fine particles are not limited, but as a specific example, the organic fine particles may have a refractive index of 1.500 to 1.600 on the basis of a wavelength of 550 nm.

Specific examples of the organic fine particles are not limited, but for example, one single substance selected from the group consisting of polystyrene, polymethyl methacrylate, polymethyl acrylate, polyacrylate, polyacrylate-co-styrene, polymethyl acrylate-co-styrene, polymethyl methacrylate-co-styrene, polycarbonate, polyvinyl chloride, polybutylene terephthalate, polyethylene terephthalate, polyamide type, polyimide type, polysulfone, polyphenylene oxide, polyacetal, epoxy resin, phenol resin, silicone resin, melamine resin, benzoguanamine, polydivinylbenzene, polydivinylbenzene-co-styrene, polydivinylbenzene-co-acrylate, polydiallyl phthalate, and triallyl isocyanurate polymer, or a copolymer of two or more thereof may be used.

Specific examples of the inorganic fine particles are not limited, but for example, the inorganic fine particles may be inorganic fine particles consisting of silicon oxide, titanium dioxide, indium oxide, tin oxide, zirconium oxide, and zinc oxide.

In order to optimize the light scattering effect in the anti-glare film, the organic or inorganic fine particles have a diameter of 1 to 10 μm, preferably 1 to 8 μm. More preferably, the organic fine particles may be particles having a diameter of 0.5 μm to 6 μm, and the inorganic fine particles may be particles having a diameter of 0.01 μm to 5 μm.

The particle size of the organic or inorganic fine particles may be 1 μm or more in terms of optimizing the scattering effect of light, and it may be 10 μm or less in terms of haze value or coating thickness.

For example, in the case where the diameter of the organic or inorganic fine particles is too large, beyond 10 μm, the coating thickness must be increased to match a proper haze, and if so, there is a problem that the crack resistance of the film is decreased.

In the hard coating layer, in order to adjust the ratio of two or more adjacent organic fine particles aggregating with each other among the whole organic fine particles to 5% or less, the diameter of the organic fine particles is also preferably within a predetermined range, and specifically, the organic fine particles may have a diameter of 0.5 μm to 6 μm.

Meanwhile, the hard coating layer may contain 5 to 25 parts by weight of the organic fine particles based on 100 parts by weight of the binder resin.

Moreover, the hard coating layer may contain 3 to 40 parts by weight of the organic fine particles and the inorganic fine particles based on 100 parts by weight of the binder resin.

The organic fine particles and the inorganic fine particles are components which are added to induce the scattering effect of light in order to prevent a glare phenomenon, the hard coating layer can contain 3 to 40 parts by weight, or 5 to 30 parts by weight of the organic fine particles and the inorganic fine particles, based on 100 parts by weight of the binder resin.

At this time, the hard coating layer may contain 5 to 25 parts by weight or 7 to 20 parts by weight of the organic fine particles based on 100 parts by weight of the binder resin.

When the content of the organic fine particles and the inorganic fine particles in the hard coating layer is too low, the haze value due to internal scattering may not be fully realized, and when the content of the organic fine particles and the inorganic fine particles in the hard coating layer is too high, the viscosity of the coating composition forming the hard coating layer becomes high, the coating properties may be poor, the haze value due to internal scattering may be too large, and thus the contrast ratio may be lowered.

In particular, the hard coating layer may contain 5 to 25 parts by weight or 7 to 20 parts by weight of the organic fine particles based on 100 parts by weight of the binder resin. When the content of the organic fine particles is too low, the haze value due to the internal scattering is not sufficiently realized, so that a focus image formation of the reflection image may increase. When the content of the organic fine particles is too high, the haze value is too high, so that the image definition may be lowered or the contrast ratio may be lowered.

Meanwhile, the binder resin may include a polymer or copolymer of a vinyl-based monomer or a (meth)acrylate-based monomer.

The vinyl-based monomer or the (meth)acrylate-based monomer may include a monomer or an oligomer containing one or more, or two or more, or three or more of (meth) acrylates or vinyl groups.

Specific examples of the monomer or oligomer containing (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, a dendritic acrylate oligomer, or a mixture of two or more thereof.

Herein, the molecular weight of the oligomers is preferably 1,000 to 10,000. Specific examples of the monomer or oligomer containing a vinyl group include divinylbenzene, styrene, and para-methyl styrene.

Further, the polymer or copolymer contained in the binder resin may further include a moiety derived from one or more monomers selected from: a reactive acrylate oligomer group consisting of urethane acrylate oligomer, epoxy acrylate oligomer, polyester acrylate and polyether acrylate; and a multifunctional acrylate monomer group consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycerotriacrylate, tripropylene glycol diacrylate and ethylene glycol diacrylate.

Meanwhile, in the step of forming the hard coating layer, methods and apparatuses commonly used for coating the photopolymerizable coating composition may be used without particular limitation, and for example, a bar coating method such as Meyer bar, a gravure coating method, a 2-roll reverse coating method, a vacuum slot die coating method, and 2 roll coating method, etc. may be used.

In the step of forming the hard coating layer, ultraviolet rays or visible rays having a wavelength of 200 to 400 nm can be irradiated, and an exposure amount during irradiation is preferably 100 to 4,000 mJ/cm$^2$.

The exposure time is also not particularly limited, and can be appropriately changed depending on the exposure device used, the wavelength of the irradiation light or the exposure amount.

Further, in the step of forming the hard coating layer, nitrogen purging can be carried out to apply nitrogen atmosphere conditions.

Meanwhile, the light-transmitting substrate may be a transparent film having a light transmittance of 90% or more and a haze value of 1% or less.

Further, the material of the substrate may be triacetylcellulose, cycloolefin polymer, poly(meth)acrylate, polycarbonate, polyethylene terephthalate, and the like.

Further, the thickness of the substrate film may be 10 to 300 μm in consideration of productivity and the like, but is not limited thereto.

More specifically, the light-transmitting substrate has a thickness direction retardation (Rth) of 3,000 nm or more, 5,000 nm or more, or 5,000 nm to 20,000 nm as measured at a wavelength of 400 nm to 800 nm.

Specific examples of such a light-transmitting substrate include a uniaxially stretched polyethylene terephthalate film and a biaxially stretched polyethylene terephthalate film.

When the anti-glare film includes a light-transmitting substrate having a thickness direction retardation (Rth) of 3,000 nm or more, or 5,000 nm or more, or 5,000 nm to 20,000 nm as measured at the wavelength of 400 nm to 800 nm, the rainbow phenomenon due to the interference of visible ray can be relaxed as compared with the case of using a retardation of 1000 to 3000 nm or less.

The thickness direction retardation (Rth) can be confirmed by a commonly known measurement method and measurement apparatus.

For example, the thickness direction retardation (Rth) can be determined using a measuring apparatus manufactured by AXOMETRICS, Inc. under the trade name of "AxoScan", and the like.

For example, the thickness direction retardation (Rth) can be determined by: inputting a value of a refractive index (589 nm) of the light-transmitting substrate film into the measuring apparatus, then, measuring the thickness direction retardation of the light-transmitting substrate film by using light at a wavelength of 590 nm under conditions of a temperature: 25° C. and a humidity: 40%; and converting the measured value of the thickness direction retardation thus determined (the value is measured according to the automatic measurement (automatic calculation) of the measuring apparatus) into a retardation value per 10 μm of the thickness of the film.

In addition, the size of the light-transmitting substrate as the measurement sample is not particularly limited, as long as it is larger than a light measurement unit (diameter: about 1 cm) of a stage of the measuring apparatus. However, the size may be a length: 76 mm, a width: 52 mm, and a thickness: 13 μm. The value of the "refractive index (589 nm) of the light-transmitting substrate" utilized in the measurement of the thickness direction retardation (Rth) can be determined by: forming an unstretched film including the same kind of resin film as the light-transmitting substrate for forming the film to be measured for the retardation, and then, measuring the unstretched film as a measurement sample (in the case where the film to be measured is an unstretched film, the film can be directly used as the measurement sample) for the refractive index for light at 589 nm in an in-plane direction (the direction perpendicular to the thickness direction) of the measurement sample by using a refractive index-measuring apparatus (manufactured by Atago Co., Ltd. under the trade name of "NAR-1T SOLID") as a measuring apparatus under a light source of 589 nm and a temperature condition of 23° C.

According to another embodiment of the present invention, there can be provided a display apparatus including the above-mentioned anti-glare film.

Specific examples of the display apparatus are not limited, and for example, the display apparatus may be a liquid crystal display device, a plasma display device, or an organic light emitting diode device.

In the display apparatus, the anti-glare film may be provided on an observer side of the display panel or on an outermost surface of the backlight side.

More specifically, the display apparatus may be a notebook display device, a TV display device, or an advertising large-area display device, and the anti-glare film may be located on the outermost surface of the notebook display device, the TV display device, and the advertising large-area display device.

Advantageous Effects

According to the present invention, there can be provided an anti-glare film capable of preventing a defective sparkling while exhibiting high contrast ratio and excellent image definition, and a display apparatus including the above-mentioned anti-glare film and capable of preventing a defective sparkling while exhibiting high contrast ratio and excellent image definition.

BRIEF DESCRIPTION OF DRAWINGS

FIG. 1 shows an optical microscope photograph of a plane of the hard coating layer obtained in Example 1.

FIG. 2 shows an optical microscope photograph of a plane of the hard coating layer obtained in Comparative Example 3.

DETAILED DESCRIPTION OF THE EMBODIMENTS

The present invention will be described in more detail with reference to the following examples. However, these examples are given for illustrative purposes only, and the scope of the invention is not intended to be limited to or by these examples.

Example and Comparative Example: Preparation of Anti-Glare Film (1) Preparation of Composition for Forming Hard Coating Layer A monomer, a polymer and a solvent for forming the binder resin shown in Table 1 below were uniformly mixed to prepare a first coating solution, and organic fine particles and inorganic fine particles were mixed with a particle-diluting solvent to prepare a second coating solution.

After sufficiently stirring each coating solution to be uniformly mixed, the two coating solutions were mixed to produce a hard coating composition.

(2) Preparation of Anti-Glare Film

The hard coating composition thus obtained was coated onto a substrate of Table 2 below with a #10 mayer bar and dried at 90° C. for 1 minute.

The dried product was irradiated with ultraviolet light of 150 mJ/cm² to form a hard coating layer, thereby preparing an anti-glare film.

TABLE 1

(content: g)

| | | | Example 1 | Example 2 | Example 3 | Comparative Example 1 | Comparative Example 2 | Comparative Example 3 | Comparative Example 4 |
|---|---|---|---|---|---|---|---|---|---|
| First coating solution | Binder | PETA | 13.854 | 14.200 | 14.200 | 13.828 | 13.828 | 13.828 | 13.854 |
| | | EB-1290 | 13.854 | 14.200 | 14.200 | 13.828 | 13.828 | 13.828 | 13.854 |
| | Initiator | I184 | 2.102 | 2.158 | 2.158 | 2.098 | 2.098 | 2.098 | 2.102 |
| | Additive | T270 | 0.200 | 0.204 | 0.204 | 0.200 | 0.200 | 0.200 | 0.200 |
| | | F477 | 0.100 | 0.117 | 0.117 | 0.100 | 0.100 | 0.100 | 0.100 |
| | Solvent | MIBK | 40.281 | 41.297 | 41.297 | 20.102 | 40.204 | 40.204 | |
| | | Ethanol | | | | 20.102 | | | 40.281 |
| Second coating solution | Particle-diluting solution | n-BA | 20.141 | 20.648 | 20.648 | 20.102 | 20.102 | 20.102 | 20.141 |
| | Inorganic fine particles | MA-ST (30% in MeOH) | 6.264 | 3.759 | 6.835 | 6.428 | 6.428 | 6.428 | 6.264 |
| | Organic fine particles | Addition amount (size/refractive index) | 3.203 (3.5 um/ 1.555) | 3.417 (3.5 um/ 1.555) | 3.417 (3.5 um/ 1.555) | 3.214 (2 um/ 1.555) | 3.214 (3.5 um/ 1.595) | 3.214 (2 um/ 1.595) | 3.203 (3.5 um/ 1.555) |
| | | Type of particle | 68BQ | 68BQ | 68BQ | 67BQ | 90BQ | 112BQ | 68BQ |

*PETA: Pentaerythritol triacrylate, SK Entis product
MA-ST: dispersion solution in which spherical silica fine particles having a volume average particle size of 12 nm and a refractive index of 1.43 (manufactured by Nissan Chemical) is dispersed in methanol at a concentration of 30%
MIBK: methyl isobutyl ketone
Ethanol: ethanol
n-BA: normal butyl acetate
EB-1290: photocurable aliphatic urethane hexaacrylate/SK Entis/solid content 100%
I184: photocuring initiator (Irgacure 184, manufactured by BASF)
T270: leveling additive having a solid content of 100% (Tego-Glide 270, manufactured by Tego Evonik)
F477: fluorine leveling additive having a solid content of 100% (F477, manufactured by DIC Chemical)
68BQ (XX-68BQ, manufactured by Sekisui Plastic): polystyrene-polymethylmethacrylate crosslinked copolymer fine particles having a refractive index of 1.555 and an average particle diameter of 3.5 μm
67BQ (XX-67BQ, manufactured by Sekisui Plastic): polystyrene-polymethylmethacrylate crosslinked copolymer fine particles having a refractive index of 1.555 and an average particle diameter of 2.0 μm
90BQ (XX-90BQ, manufactured by Sekisui Plastic): polystyrene-polymethylmethacrylate crosslinked copolymer fine particles having a refractive index of 1.595 and an average particle diameter of 3.5 μm
112BQ (XX-112BQ, manufactured by Sekisui Plastic): polystyrene-polymethylmethacrylate crosslinked copolymer fine particles having a refractive index of 1.595 and an average particle diameter of 2 μm.

TABLE 2

| | Example 1 | Example 2 | Example 3 | Comparative Example 1 | Comparative Example 2 | Comparative Example 3 | Comparative Example 4 |
|---|---|---|---|---|---|---|---|
| Substrate (Retardation nm) | SRF PET (>5000) | SRF PET (>5000) | SRF PET (>5000) | SRF PET (>5000) | SRF PET (>5000) | SRF PET (>5000) | SRF PET (>5000) |

*SRF PET: Super Retarder Film PolyEthylene Terephthalate

Experimental Example

1. Confirmation of the Ratio of Organic Fine Particles Aggregating in the Hard Coating Layer With respect to the hard coating layer obtained in each of Examples and Comparative Examples, a transmission image was taken with an optical microscope (Oxmpus BX51 optical microscope) to confirm the ratio of organic fine particles which aggregate with each other.

In detail, the film was placed so that the hard coating layer faces on the objective lens side, and the transmission image was observed by setting the microscope to 10× eyepiece lens and 10× or 20× objective lens.

When there was a difference in distance of about 0.5 μm or more in the thickness direction on the basis of one surface of the hard coating layer, it was judged that the organic fine particles were aggregated with each other.

When observing the overlapping particle site, the cross section of the particle located at the bottom was focused to confirm the overlap of the particles located at the top.

At this time, when the upper particles were not overlapped in the thickness direction, the overlapping portions of the two particles must not be confirmed.

Meanwhile, when the two particles were overlapped in the thickness direction, the lower particles that were in focus did not look like a sharp spherical shape, and it was observed in the form that a part was hidden by the upper particle.

After confirming the number of overlapped particles in this manner, the ratio of overlapped particles was calculated by dividing it by the number of total particles on the same measurement surface.

2. Evaluation of Light Transmittance and Total/Internal/External Haze

A specimen with a size of 4 cm×4 cm was prepared from the anti-glare film obtained in each of Examples and Comparative Examples, and the average value was measured three times with a haze meter (HM-150, A light source, Murakami Color Research Laboratory), which was calculated as a total haze value.

In the measurement, the transmittance and the haze value were measured at the same time. The light transmittance was measured according to JIS K 7361, and the haze value was measured according to JIS K 7105.

In measuring the internal haze value, an adhesive film having a total haze value of 0 was bonded to the coated surface of the optical film to be measured to make the unevenness of the surface smooth, and then an internal haze value was measured in the same manner as that of the total haze value.

The external haze value was calculated as the average of the values obtained by calculating the difference between the total haze value and the measured value of the internal haze.

3. Confirmation of Occurrence of Rainbow

A specimen with a size of 10 cm×10 cm was prepared from the anti-glare film obtained in each of Examples and Comparative Examples, and a black film (UTS-30BAF film, manufactured by Nitto) was adhered to the opposite surface of the hard coating layer using a lamination process.

After allowing a light of a three-wavelength lamp to reflect on the hard-coated surface of the film, it was confirmed whether or not the rainbow of the reflected image was occurred.

<Measure Standard>
    X: Rainbow is not visible
    Medium: Rainbow is weakly visible. The difference in average wavelength between colors that form a rainbow, such as green-blue, blue-purple, etc. is 80 nm or less.
    Strong: Rainbow is strongly visible. Colors forming a rainbow such as red-green, orange-blue, etc. have complementary color relation to each other, or mean wavelength difference is more than 100 nm.
4. Confirmation of Occurrence of Sparkling
    A sample with a size of 12 cm×12 cm was prepared from the anti-glare film obtained in each of Examples and Comparative Examples, and the sample was placed so that the hard coating surface faces upward on the 150 PPI panel.
    At this time, tape may be adhered to the slope so that the film is not floated.
    After that, the panel was driven so that a white screen could be seen, and it was then confirmed whether or not sparkling occurred in an area within 10 cm×10 cm of the sample.
<Measure Standard>
    Excellent: Sparkling occurs
    Defective: No sparking occurs
6. Measurement of Image Definition (%)
    The anti-glare film obtained in each of Examples and Comparative Examples was measured for image definition using ICM-1T (manufactured by Suga Test Instrument Co., Ltd.).
    The image definition was measured in slit widths of 0.125 mm, 0.5 mm, 1 mm, and 2 mm, and expressed as a sum.

TABLE 3

| Category | Example 1 | Example 2 | Example 3 | Comparative Example 1 | Comparative Example 2 | Comparative Example 3 | Comparative Example 4 |
|---|---|---|---|---|---|---|---|
| Thickness of hard coating layer | 4.8 | 5.5 | 5 | 5.5 | 5.1 | 4.7 | 4.8 |
| Transmittance | 92.5 | 92.5 | 93.4 | 91.3 | 92.5 | 93 | 92.5 |
| Internal haze(hi) | 11.5 | 13.6 | 12.6 | 7.9 | 30.5 | 20.8 | 11.5 |
| External haze (Hs) | 9.2 | 9.3 | 9.8 | 13.8 | 9.1 | 8.3 | 9.2 |
| hi/Hs | 1.3 | 1.5 | 1.3 | 0.6 | 3.4 | 2.5 | 1.3 |
| Rainbow | X | X | X | Medium | X | X | X |
| Sparkling | Excellent | Excellent | Excellent | Defective | Excellent | Defective | Defective |
| Image definition | 153.1 | 155.5 | 152.3 | 224 | 79.1 | 121.3 | 125.5 |
| Particle aggregation rate | 4.08 | 3.8 | 2.0 | >5 | 1.6 | 7.65 | >5 |

As can be seen in Table 3 above, in the case of the anti-glare films of Examples in which the ratio of the organic fine particles aggregating in the whole organic fine particles was 5% or less and the ratio of the internal haze to the external haze was 2.5 or less, it was confirmed that the rainbow phenomenon and the sparkling phenomenon were not occurred and excellent image definition could be realized.

In contrast, in the case of the anti-glare films of Comparative Examples 1, 2, and 4 in which the ratio of the organic fine particles aggregating in the whole organic fine particles exceeded 5%, it was confirmed that sparkling phenomenon occurred excessively, rainbow phenomenon occurred or image definition appeared to be low. Further, in the case of the anti-glare film of Comparative Example 2 in which the ratio of the organic fine particles aggregating in the whole organic fine particles was 1.6% but the ratio of the internal haze to the external haze was 3.4, sparkling phenomenon was occurred and low image definition was shown.

The invention claimed is:

1. An anti-glare film comprising: a light-transmitting substrate; and a hard coating layer containing a binder resin, organic fine particles and inorganic fine particles, wherein the organic fine particles and the inorganic fine particles are dispersed in the binder resin, wherein the hard coating layer has a thickness of 1 to 10 μm, wherein the organic fine particles have a diameter of 0.5 μm to 6 μm and a refractive index of 1.500 to 1.600 at a wavelength of 550 nm, wherein the inorganic fine particles have a diameter of 0.01 μm to 5 μm, wherein a ratio of two or more organic fine particles aggregating with each other in the total organic fine particles is 2.0% to 4.08%, and wherein the anti-glare film has an external haze value of 9.2 to 9.8%, an internal haze value of 11.5 to 13.6%, and a ratio of internal haze to external haze of 1.3 to 1.5.

wherein two adjacent organic fine particles among the two or more organic fine particles aggregating with each other are located at different distances from one surface of the hard coating layer, and the ratio of the two or more organic fine particles existing while aggregating, in the total organic fine particles, at different positions in the thickness direction of the hard coating layer in this way is adjusted to 3.5% or less and, wherein two adjacent organic fine particles among the two or more organic fine particles aggregating with each other have a focus on respective optical microscopes at different positions with respect to a thickness direction on the basis of one surface of the hard coating laye wherein two adjacent organic fine particles among the two or more organic fine particles aggregating with each other are located with a distance difference of at least 0.1 μm from one surface of the hard coating layer.

2. The anti-glare film according to claim 1, wherein two adjacent organic fine particles among the two or more organic fine particles aggregating with each other have a focus on respective optical microscopes at different positions with respect to a thickness direction on the basis of one surface of the hard coating layer.

3. The anti-glare film according to claim 1, wherein the binder resin includes a polymer or copolymer of a vinyl-based monomer or a (meth)acrylate-based monomer.

4. The anti-glare film according to claim 1, wherein the hard coating layer contains 5 to 25 parts by weight of the organic fine particles based on 100 parts by weight of the binder resin.

5. The anti-glare film according to claim 1, wherein the light-transmitting substrate has a thickness direction retardation (Rth) of at least 3,000 nm as measured at a wavelength of 400 nm to 800 nm.

6. A display apparatus comprising the anti-glare film according to claim 1.

7. The display apparatus according to claim 6, wherein the display apparatus is a notebook display device, and the anti-glare film is located on an outermost surface of the notebook display device.

8. The anti-glare film according to claim 1, wherein two adjacent organic fine particles among the two or more organic fine particles aggregating with each other are located with a distance difference of at least 0.1 μm from one surface of the hard coating layer.

* * * * *